Figure 1:
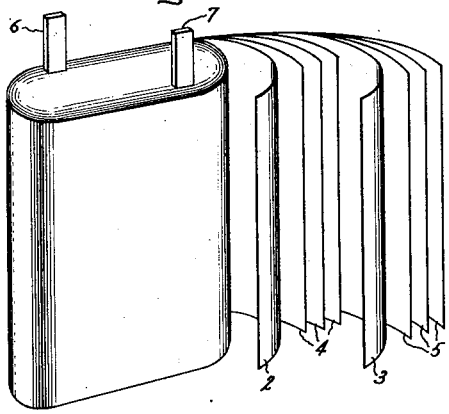

Nov. 5, 1946.    F. M. CLARK    2,410,714

DIELECTRIC AND INSULATING COMPOSITION

Filed March 31, 1942

Inventor:
Frank M. Clark,
by Harry E. Dunham
His Attorney.

Patented Nov. 5, 1946

2,410,714

UNITED STATES PATENT OFFICE 2,410,714

DIELECTRIC AND INSULATING COMPOSITION

Frank M. Clark, Pittsfield, Mass., assignor to General Electric Company, a corporation of New York Application March 31, 1942, Serial No. 436,930

11 Claims. (Cl. 252—63.7)

The present invention comprises compositions suitable for the insulating and dielectric uses and containing aromatic sulfone as an ingredient.

Sulphur compounds have been considered to be unsuitable in dielectric or insulating compositions. The fact that electric devices, as for example transformers, capacitors, cables and the like, contain metal parts which are susceptible to corrosion and the fact that sulphur compounds were believed to be chemically unstable under the conditions encountered in the normal operation of electric apparatus gave rise to the general belief that the presence of sulfones in electric insulating and dielectric compositions unfitted them for normal use.

I have discovered that aromatic sulfones, contrary to this general impression, are chemically stable under the conditions of use of insulating and dielectric compositions. I have further discovered that aromatic sulfones have other unexpected and favorable properties, and in particular that combinations of sulfones with hereindescribed known dielectric materials show dielectric characteristics having unexpected advantages for the dielectric field. In general, dielectric materials suitable for association with sulfones comprise materials having a lower power factor and higher resistivity than the aromatic sulfones.

The new compositions embodying my invention include blends of a stable organic insulating material, non-sulfonic in nature, and aromatic sulfone. The latter ordinarily constitutes a minor proportion but may constitute relatively large proportions up to about 95% of the entire composition.

The non-sulfone component may consist of or be derived from one or more members of the class consisting of mineral oil, vegetable oil and chlorinated aromatic hydrocarbon, and should possess high resistivity and high electric break-down characteristics. The sulfone component consists of one or more compounds having a molecular formula which may be represented as

R and R₁ are aromatic hydrocarbon radicals which may be alike or different. Examples of such diaryl sulfones are dinaphthyl sulfone, diphenyl sulfone, dixenyl sulfone, naphthyl phenyl sulfone and phenyl xenyl sulfone.

As the associated ingredient may be employed petroleum products, such for example as mineral oil or mineral wax, chlorinated naphthalene, one or more of the class of materials generically termed askarels, which include chlorinated hydrocarbons such as chlorinated benzene, chlorinated diphenyl, chlorinated diphenyl oxide, chlorinated diphenyl methane, chlorinated diphenyl benzene and alkyl derivatives thereof. I may also employ as the non-sulfonic ingredient hydrogenated compounds, such for example as hydrogenated vegetable oil such as hydrogenated linseed oil or hydrogenated castor oil (opal wax), or hydrogenated naphthalene or hydrogenated diphenyl.

Figure 2:
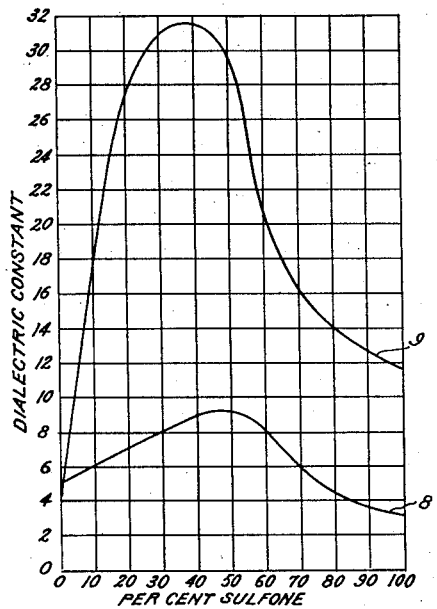
Figure 3:
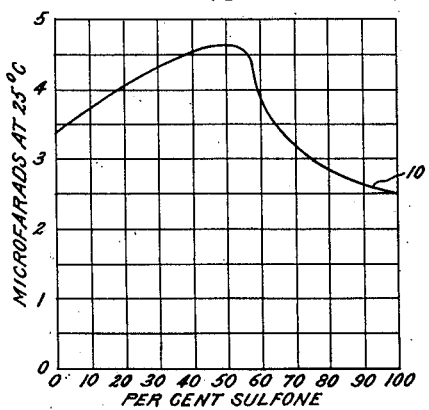
Figure 4:
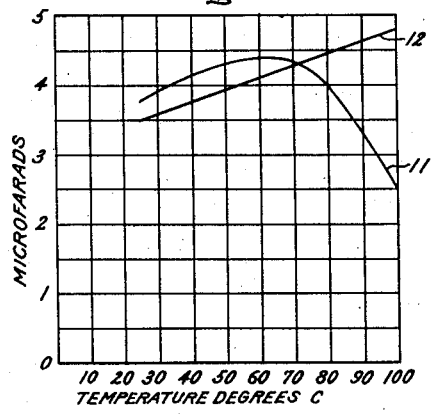

The accompanying drawing shows in Fig. 1 a roll-type capacitor, the spacer of which may be impregnated with compositions embodying my invention; Fig. 2 comprises graphs showing the dielectric constant at different temperatures for a range of proportions of compositions comprising pentachlor diphenyl and dinaphthyl sulfone; Fig. 3 is a graph showing the capacity in microfarads of a capacitor containing such compositions; and Fig. 4 is a graph showing the characteristics for a range of temperatures of comparison unit capacitors respectively impregnated with hydrogenated castor oil alone and with a composition consisting by weight of 75 parts of such hydrogenated castor oil composition and 25 parts of diphenyl sulfone.

The following aromatic sulfones have been found to be of particular utility as ingredients in dielectric compositions embodying my invention. Each of these sulfones is a neutral, resinous solid, the melting point being stated opposite the respective sulfone compound:

|  | °C. |
|---|---|
| Dinaphthyl sulfone $(C_{10}H_7)_2SO_2$ | 68 |
| Diphenyl sulfone $(C_6H_5)_2SO_2$ | 123–126 |
| Dixenyl sulfone $(C_{12}H_9)_2SO_2$ | 190–200 |
| Phenyl naphthyl sulfone $(C_6H_5)(C_{10}H_7)SO_2$ | 30 |
| Phenyl xenyl sulfone $(C_6H_5)(C_{12}H_9)SO_2$ | 143–146 |

While many of the sulfones herein referred to are known chemical compounds, I shall describe for the sake of illustration the preparation of dinaphthyl sulfone.

1000 parts of naphthalene are mixed with constant stirring with 1400 parts of 96% concentrated sulfuric acid at a temperature in the range from 80 to 100° C. After approximately 12 hours at this temperature under constant stirring, the reaction mixture is slowly poured into cold water. It is neutralized with calcium hydroxide or equivalent basic material and filtered. The filtrate is dried under vacuum at 120° C. It consists of the calcium salt of naphthalene sulfonic acid. 950 parts of this product are dissolved in water and treated with 214 parts of 96% concentrated sulfuric acid. The solution of naphthalene sulfonic acid so prepared is filtered. The filtrate is dried under vacuum and reacted with thionyl chloride to produce the sulfonyl chloride as follows:

1120 parts of the sulfonic acid are treated with 1500 parts of thionyl chloride and maintained at room temperature for 48 hours. This mixture is diluted with 1000 parts of trichlor ethylene and is washed with water. It is neutralized with a dilute solution of sodium carbonate and distilled. The product, naphthalene sulfonyl chloride, distills in the range of 180 to 210° C. at 15 mm. of mercury pressure. It consists of a yellow, viscous liquid. To prepare the desired dinaphthyl sulfone, 410 parts of the naphthyl sulfonyl chloride and 300 parts of naphthalene are dissolved in 1000 parts of nitrobenzene to which is added 280 parts of aluminum chloride over a period of one hour at 35 to 40° C. The reaction mixture is held for one hour at 50° C. whereupon the mixture is poured into water from which the sulfone is extracted by the use of approximately 1000 parts of benzene. The benzene solution is washed with dilute aqueous sodium hydroxide and water and is then distilled. The dinaphthyl sulfone so prepared distills in the range of 280 to 340° C. under 10 mm. pressure. The product is a hard resin, amber in color and melting at about 68° C.

In order to compare the electrical characteristics of capacitors containing as dielectric elements examples of compositions embodying my invention, I shall select a capacitor of a type similar to that commonly used for commercial purposes and shall term such capacitor herein as a comparison unit. The chosen comparison unit is constructed as shown in Fig. 1. It is assumed to consist of cooperating armatures 2, 3 of aluminum foil which may be approximately .0003 inch thick and are spaced from each other by one or more spacers of solid insulating material. Three sheets of kraft capacitor tissue, each .0004 inch in thickness, are assumed to be used. The armatures 2, 3 and the paper spacers 4, 5 are wound into cylindrical rolls which are later pressed into an approximately oval shape and enclosed in a container which has not been shown. Commonly, two such rolls are connected electrically in parallel contact to the armatures being made by conductors 6, 7.

The described assembly is prepared for impregnation by being dried, preferably under vacuum at elevated temperature. Upon impregnation with a chosen dielectric composition, such for example as pentachlor diphenyl, mineral oil or wax, the container is hermetically sealed. The chosen comparison unit when impregnated with mineral oil or wax has a capacity of about 2.24 microfarads. When impregnated with pentachlor diphenyl, it has a capacity of about 3.4 microfarads. The power factor of the comparison unit is in the range of from about .3 to .6 per cent, depending on the temperature of test and other conditions.

Aromatic sulfones, when used as impregnants in paper-spaced capacitors of the type above-described, result in a prohibitively high dielectric loss in such capacitor. At 75° C., which is a temperature within the normal range of commercial operation, the per cent power factor of such sulfone-impregnated capacitor is within the range of 2.6 to 9.5 per cent. Such high power losses lead to heat accumulations within the assembly when operated on alternating current circuits. Heating ultimately leads to dielectric failure of a capacitor.

Pentachlor diphenyl unassociated with other ingredients has a dielectric constant of about 5 at 25° C. and 4.5 at 75° C. Dinaphthyl sulfone prepared as above described has a dielectric constant of 3 at 25° C. and 11.5 at 75° C.

As shown in curve 8 of Fig. 2, a composition consisting of substantially equal parts by weight of these two ingredients has a dielectric constant of about 9.5 at 25° C. As shown in curve 9, the dielectric constant at 75° C. of the equal parts composition is about 30. This is about three times as high as that of the dinaphthyl sulfone alone. A composition comprising about 30 parts by weight of dinaphthyl sulfone and 70 parts of pentachlor diphenyl has a dielectric constant of about 8 at 25° C. and about 31 at 75° C. The dielectric constant of a blend of dinaphthyl sulfone and pentachlor diphenyl appears to reach a maximum value when the mixture possesses about 40 parts of the sulfone and 60 parts of the pentachlor diphenyl. This mixture has a dielectric constant at 75° C. of about 31.6.

A comparison unit capacitor made as above described, when impregnated with a composition consisting of from 25 to 50 parts of dinaphthyl sulfone and from 75 to 50 parts of pentachlor diphenyl, has, as shown by the curve 10 in Fig. 3, a capacity within the range of about 4.2 to 4.6 microfarads at 25° C. This represents an increase of from 23 to 35% over the capacity of the same comparison unit when impregnated with pentachlor diphenyl alone and an increase of 68 to 84% over the capacity of such comparison unit impregnated with dinaphthyl sulfone alone. As shown by this graph, the capacity is greater than when pentachlor diphenyl alone is present over a range of sulfone content of about 1 to 65 per cent.

High power losses normally are associated with compounds having a high dielectric constant. Unexpectedly, however, compounds embodying my present invention constitute an exception to such generally accepted rule. Despite the high electrical capacity of a comparison unit when impregnated with a composition consisting of pentachlor diphenyl and dinaphthyl sulfone, the power factor of such unit is relatively low. At 75° C. power factor values of less than .75% are obtained when the comparison capacitor is impregnated with pentachlor diphenyl and dinaphthyl sulfone compositions of the type described. A comparison unit impregnated with a composition consisting by weight of 25 parts of dinaphthyl sulfone and 75 parts of pentachlor diphenyl has at 25° C. a power factor of .45% and at 75° C. a power factor of .55%.

Similar results are obtained with compositions containing in place of dinaphthyl sulfone various other aromatic sulfones, such as diphenyl sulfone, phenyl naphthyl sulfone, and others above indicated. For example, a comparison unit containing as an impregnant a composition consisting by weight of 25 parts of phenyl naphthyl sulfone and 75 parts of pentachlor diphenyl has an electrical capacity of 4.3 microfarads at 25° C. and a power factor of .40%.

Instead of pentachlor diphenyl, various other chlorinated aromatic hydrocarbon compounds can be blended with a sulfone as previously described. Equally advantageous results are obtained when a component of the composition consists of a suitable hydrocarbon, such as mineral oil or wax, or of hydrogenated castor oil.

Additions of even one per cent by weight of dinaphthyl sulfone to mineral oil of the type known as high voltage cable oil (viscosity 100 seconds Saybolt Universal at 37.8° C.), materially reduces the power factor at elevated temperatures, that is, at about 75 to 100° C. for alternating current fields.

Even for the direct current field the addition of about one per cent dinaphthyl sulfone increases the resistance of a direct current circuit capacitor as shown below:

| Treating composition | Resistance of capacitor at 100° C. megohms×microfarad capacity |
|---|---|
| Mineral oil (unmodified) | 116 |
| Mineral oil—1% dinaphthyl sulfone | 450 |

For some fields of use, such for example as for use in cable joints, pot heads, bushings and for sealing capacitors, compositions embodying my invention possess advantages. For some purposes compositions comprising by weight 75 to 90 per cent of pentachlor diphenyl and 25 to 10 per cent of dixenyl sulfone are preferred. The following table gives the flow points of several such mixtures:

| Proportion pentachlor diphenyl | Proportion dixenyl sulfone | Flow point |
|---|---|---|
| Per cent | Per cent | ° C. |
| 90 | 10 | 108 |
| 85 | 15 | 115 |
| 75 | 25 | 135 |

Blends or mixtures of chlorinated diphenyl and diphenyl sulfone may be more adapted for cable joint, pot head and general sealing application. Following are the flow points of a series of blends of this kind, the proportions being by weight:

| Proportion diphenyl | Proportion sulfone | Flow point |
|---|---|---|
|  |  | ° C. |
| 75 | 25 | 70 |
| 50 | 50 | 95 |
| 25 | 75 | 103 |
| 20 | 80 | 110 |
| 15 | 85 | 117 |
| 10 | 90 | 120 |
| 5 | 95 | 123 |

It is well known that at temperatures exceeding about 80° C. capacitors treated with hydrogenated castor oil undergo a radical loss in electrical capacity. When, however, hydrogenated castor oil is associated with an equal or minor proportion of aromatic sulfone, the sudden reduction or "break" in the electrical capacity of such unit at elevated temperatures is not experienced.

As shown by the curve 11, Fig. 4, a comparison capacitor, for example, when impregnated with hydrogenated castor oil has a capacity of about 4.3 microfarads at 75° C. The capacity drops to less than 3 microfarads at 100° C. When such capacitor is impregnated with a mixture containing 75 parts of the hydrogenated castor oil and 25 parts of diphenyl sulfone, the 75° C. capacity of 4.4 microfarads, curve 12, shows no tendency to fall toward a lower value when heated to higher temperatures. Instead, the capacity increases to a value of about 4.8 microfarads. This ability of the unit to maintain its high capacity at high temperatures is important in many commercial capacitor applications, as for example in motor-starting service. In a patent issued on the same date as the present patent, the application for which bears Serial No. 582,174 and was filed on March 10, 1945, compositions comprising hydrogenated vegetable oil and aromatic sulfone are described and claimed.

What I claim as new and desire to secure by Letters Patent of the United States is:

1. A composition suitable for dielectric purposes comprising by weight about 20 to 60 parts of dinaphthyl sulfone and about 80 to 40 parts of chlorinated diphenyl.

2. A composition suitable for dielectric purposes comprising approximately equal parts by weight of dinaphthyl sulfone and pentachlor diphenyl.

3. A dielectric composition comprising about 75 to 90 parts by weight of chlorinated aromatic hydrocarbon and about 25 to 10 parts by weight of diaryl sulfone.

4. A composition suitable for impregnating electric capacitors comprising by weight about 1 to 65 per cent of a diaryl sulfone and about 99 to 35 per cent of chlorinated diphenyl.

5. A composition suitable for impregnating electric capacitors comprising by weight about 1 to 65 per cent of dinaphthyl sulfone and about 99 to 35 per cent of pentachlor diphenyl.

6. A dielectric and insulating composition consisting of one per cent to 95 per cent of a diaryl sulfone and an associated material selected from the class consisting of mineral oil, vegetable oil and chlorinated aromatic hydrocarbon.

7. A dielectric and insulating composition consisting by weight about 10 to 25 parts of diaryl sulfone and about 90 to 75 parts of chlorinated diphenyl.

8. A dielectric having a high specific inductive capacity comprising, in combination, a mixture of diaryl sulfone and a substantial proportion of chlorinated diphenyl.

9. A capacitor, comprising, in combination, a casing, electrodes in the casing and a high specific inductive capacity dielectric in the casing cooperatively associated with the electrodes, the dielectric comprising a mixture of diaryl sulfone and a substantial proportion of halogenated diphenyl.

10. A dielectric having a high specific inductive capacity consisting of a mixture of diaryl sulfone and a substantially equal proportion of chlorinated diphenyl.

11. A dielectric having a high specific inductive capacity comprising, in combination, a mixture of diaryl sulfone and a substantial proportion of from 50% to 60% chlorinated diphenyl.

FRANK M. CLARK.